United States Patent [19]

Gundlach et al.

[11] Patent Number: 5,074,406
[45] Date of Patent: Dec. 24, 1991

[54] LAMINATED SPROCKET

[75] Inventors: James O. Gundlach, New Orleans; Brent A. Ledet, Kenner, both of La.

[73] Assignee: The Laitram Corporation, New Orleans, La.

[21] Appl. No.: 529,511

[22] Filed: May 29, 1990

[51] Int. Cl.$^5$ ............................................. B65G 23/06
[52] U.S. Cl. ....................................... 198/834; 474/157
[58] Field of Search ................. 198/834; 474/156, 157, 474/164

[56] References Cited

U.S. PATENT DOCUMENTS

| | | | |
|---|---|---|---|
| 1,201,748 | 10/1916 | Luce | 474/156 |
| 1,835,406 | 12/1931 | Kirsten | 474/156 |
| 3,674,130 | 7/1972 | Carmichael | 198/834 |
| 4,729,469 | 3/1988 | Lapeyre et al. | 198/834 |
| 4,886,158 | 12/1989 | Lapeyre | 198/834 |
| 4,993,543 | 2/1991 | Lapeyre | 198/834 |

Primary Examiner—Joseph E. Valenza
Attorney, Agent, or Firm—Laurence R. Brown; James T. Cronvich

[57] ABSTRACT

A sprocket arrangement which provides increased contact surface area for driving conveyor belts is disclosed. The sprocket is particularly suitable for abrasive applications and/or use with modular plastic belts. The sprocket is formed by stacking and aligning a multiplicity of thin substantially disk shaped sprocket lamina together and then joining the stacked and aligned lamina by simply bolting or welding. Each of the sprocket lamina includes a central aperture for fitting onto a drive shaft. Teeth or other driving surfaces are also formed around the perimeter of each of the lamina. The lamina may be stacked in contact with each other, or for some applications may use spaces to separate selected ones of the stacked lamina so as to cooperate with the structure of the belt being driven.

19 Claims, 5 Drawing Sheets

LAMINATED SPROCKET

TECHNICAL FIELD

This invention relates to a new and simple to manufacture sprocket for use with modular conveyor belts which are pivotally connected by pivot rods. More particularly this invention relates to sprockets which provide driving surfaces with increased contact areas such that they are better suited for use in abrasive applications. The sprockets are preferably formed by stacking and joining a plurality of substantially similar lamina which have a drive aperture and a group of driving surface, such as teeth, aligned or in register with each other. In a preferred embodiment, the lamina comprising the sprockets of this invention, are formed of metal plates or sheet material which may be manufactured by laser cutting or stamping.

BACKGROUND

A typical modular conveyor belt suitable for being driven by a sprocket built according to this invention is disclosed in U.S. Pat. No. 3,870,141 issued to J. M. Lapeyre on Mar. 11, 1975. According to this patent, substantially identical modules formed by injection molding are pivotally connected to one another to form a conveyor belt or a desired length. Each module includes a plurality of elongated elements, and each elongated element has a first pivot end and a second pivot end. The plurality of elongated elements are joined together such that the apertures defined in each of the first and second pluralities of pivot ends lie along a first and second pivot axis respectively which are parallel one to the other. The link ends of one module are intermeshed and pivotally connected by means of a pivot rod to the link ends of another module until an entire belt having the desired length is formed. Injection molded plastic belts built according to the teachings of this patent have been well received by industry and have many uses.

U.S. Pat. No. 4,051,949 issued Oct. 4, 1977 also to Lapeyre, describes another modular plastic conveyor belt which solved the problem of removing small and/or unstable articles from a conveyor belt without tipping over. The belt provides for a multiplicity of channels formed in the modules which receive the "teeth" of a comb. The belt disclosed in U.S. Pat. No. 4,171,045 also issued to Lapeyre, is similar to that of the 3,870,141 and U.S. Pat. No. 4,051,949 discussed above, except that selected ones of the vanes include a plurality of "dogs" which extend above the normal portion of the conveying surface to contact and push articles on the conveying surface along such that the belt will not slip underneath.

In a similar manner, U.S. Pat. No. 4,213,527 issued June 22, 1980 to J.M. Lapeyre, et al, further discloses a module for forming a link conveyor belt which has ridges or flight members extending transverse to the direction of travel for preventing the conveyor belt from slipping under articles riding on the conveyor belt surface. Similarly U.S. Pat. No. 4,170,281 issued on Oct. 19, 1979 and U.S. Pat. No. 4,080,842 issued on Mar. 22, 1978, both to Lapeyre, also show conveying belts having members extending transverse to the conveying surface for moving articles on the conveying surface along the belt such that the belt cannot slip underneath the article.

Other modular link conveyor belt patent applications or patents by J.M. Lapeyre and owned by the same assignee as the present invention which are suitable for being driven by the sprocket of this invention, include U.S. Pat. No. 4,832,187 entitled "Modular Center Drive Conveyor Belt" filed Aug. 19, 1980.

Other types of modular plastic conveyor belts produced and manufactured by other than the assignee of this invention include the following:

The "All-in-One" ® conveyor belt manufactured by the KVP Company in Sacramento, Calif. and illustrated in FIG. 4 of U.S. Pat. No. 4,742,907 issued May 10, 1988 to Karl V. Palmaer, is a modular plastic belt driven at a central transverse connecting member which can be brick-layed, and therefore can be provided in different widths.

A plastic modular belt sold by the Cambridge Wire Cloth company of Cambridge, Md. under the name of Cam-Clean ® and substantially described in U.S. Pat. No. 4,557,374 issued on Dec. 10, 1985 to Robert H. Bode is driven in the center area of a module by a sprocket tooth received by a recess in the module defined by a pair of transverse connecting members.

Finally, the Rexnord Corp. of Milwaukee, Wis. has recently introduced a group of plastic conveyor belts designated as the "5900" series which uses individual and separate snap-in plugs to retain "headless" pivot rods in position.

Thus, a review of the conveyor belt prior art patents and commercial belts as well as pending applications of the assignee of the present invention reveals that to date there has not been an easy, simple and inexpensive technique for providing a sprocket having a drive surface with increased contact area particularly suitable for high abrasive applications. More particularly, none of the prior art conveying belts or systems teach the fabrication of such sprockets by stacking and aligning similar lamina. Therefore, it is an object of this invention to provide conveyor belt sprockets suitable for use with all types of conveyor belts including modular plastic conveyor belts which have increased drive surface areas and which are easily and inexpensively manufactured.

DISCLOSURE OF THE INVENTION

Other objects and advantages will be obvious, and will in part appear hereinafter and will be accomplished by the present invention which provides a method of fabricating a sprocket of a selected diameter and having at least two circumferential groups of driving surfaces spaced across the width of the sprocket for use with conveyor belts. The method of fabricating the sprocket comprises the steps of providing a plurality of sprocket lamina, or layers, having substantially a constant thickness and wherein each lamina has a selected axis of rotation. A drive aperture such as a square shape or a hexagon shape, is formed or cut in each of the lamina so as to be coaxial with the axis of rotation. Also formed or cut on selected ones of the lamina are a multiplicity of driving surfaces, such as sprocket teeth, at selected radial distances from the axis of rotation and spaced at selected angular positions around the axis of rotation. Each such lamina thereby defines a circumferential group of driving surfaces. The multiplicity of lamina are then stacked and aligned such that the drive apertures formed in each lamina are in register with each other. The lamina are further aligned such that the circumferential group of driving surfaces on each of the "selected ones" lamina are in register with each other. The stacked and aligned lamina are then joined together by any suitable means such as bolting or welding to form a rigid structure which has at least two driving surfaces at each of the selected angular positions around the drive axis. In certain embodiments of the invention, each of the lamina or layers has teeth formed thereon such that once the lamina are stacked and aligned a tooth wider than a single lamina is provided. In other embodiments, each of the tooth lamina are separated by some type of spacer means such that a space exists between each of the tooth lamina. In this arrangement, there will be a multiplicity of teeth spaced across the width of the sprocket.

BRIEF DESCRIPTION OF THE DRAWINGS

The above features of the present invention will be more clearly understood from consideration of the following description in connection with the accompanying drawings in which.

BEST KNOWN MODE FOR PRACTICING THIS INVENTION

Figure 1:
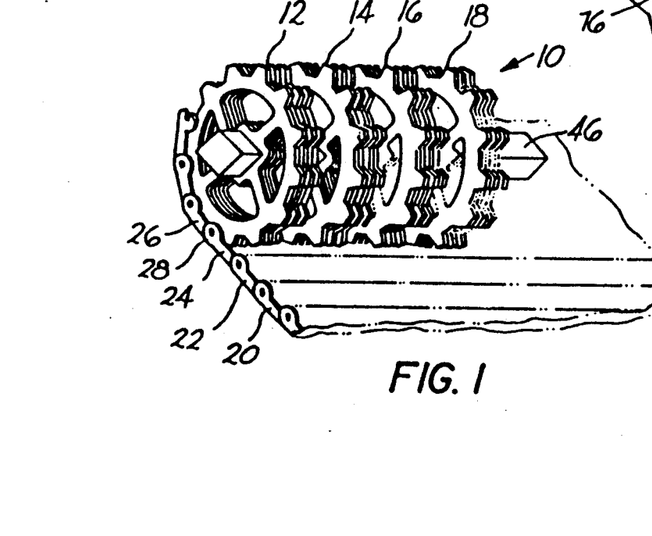
FIG. 1 is a perspective view of a plastic modular conveyor belt cooperating with four sprockets formed of stacked and aligned lamina incorporating the features of this invention.
Figure 2A:
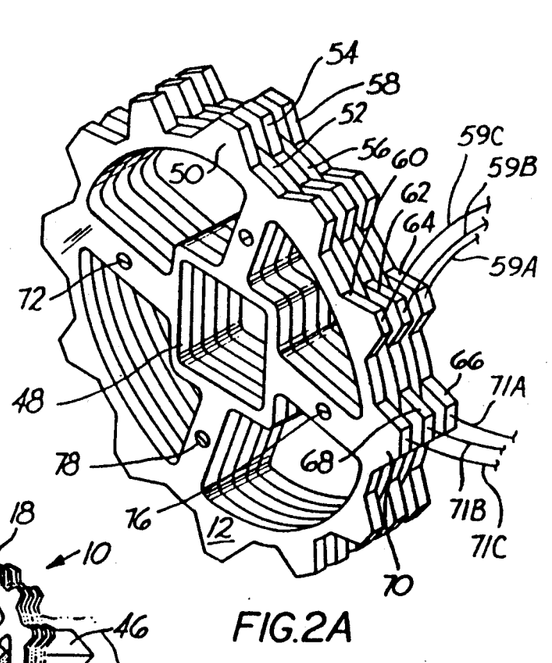
FIGS. 2A & 2B shows an enlarged section of the belt and of the drive sprockets shown in FIG. 1.
Figure 2B:
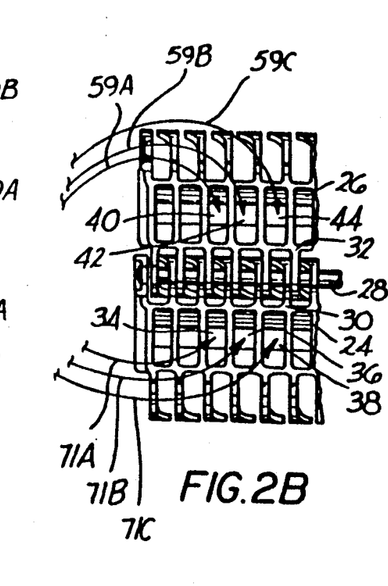
Figure 3:
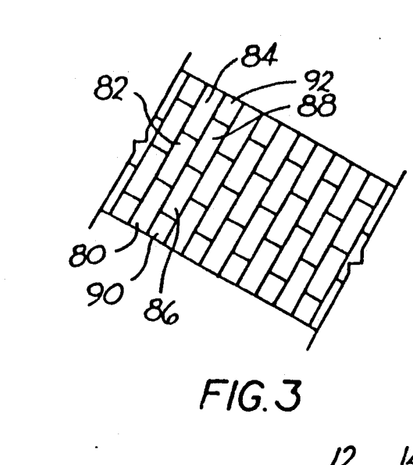
FIG. 3 is a diagramatic sketch showing how a typical belt used with the sprocket of this invention may be brick-layed to form a belt of any selected width.

Referring now to FIGS. 1, 2 and 3 there is shown generally at 10 a section of a plastic modular conveyor belt cooperating with four sprockets 12, 14, 16 and 18 which incorporate the features of this invention. As shown in FIG. 1, a conveyor belt is formed of rows 20, 22, 24 and 26 of modules, each row including several full modules and/or full modules and portions of modules. As can better be seen in FIGS. 2A and 2B, which illustrate an enlarged view of sprocket 12 and a portion of the belt including rows 24 and 26. Each of the rows are pivotally connected or joined by means of pivot rods such as pivot rod 28 which extends through apertures defined in the end of elongated link 30 of row 24 and link 32 of row 26. The rows 24 and 26 as shown in FIG. 2B are illustrated with numerous recesses for receiving sprocket teeth such as recesses 34, 36 and 38 of row 24 and recesses 40, 42 and 44 of row 26. The four sprockets 12, 14, 16 and 18 (shown in FIG. 1) are driven by a drive shaft 46 having a square cross-section, which is received by a square aperture in the sprockets such as aperture 48 shown in FIG. 2. As shown, each of the sprockets are formed by five spaced and stacked lamina such as stacked lamina 50, 52, 54, 56 and 58, of which laminas 50, 54 and 58 include teeth or driving surfaces. Referring now to FIGS. 2A and 2B it can be seen that teeth 60, 62 and 64 of stacked lamina 50, 54 and 58 respectively mesh with recesses 40, 42 and 44 of rows 26 of the belt section as indicated by arrows 59A, 59B and 59C. In a similar manner, teeth 66, 68 and 70 mesh with recesses 34, 36 and 38 respectively of row 24 of the belt section as indicated by arrow 71A, 71B and 71C. Thus by using these thin lamina stacked together, the resultant sprockets provide increased driving surface area over a selected width of the belt. It will of course be appreciated that each sprocket structure could provide a number of tooth lamina different than three, and a larger number or lesser number of sprocket structures than four could be spaced along drive shaft 46 across the width of the belt.

The enlarged section of the belt 10 and sprocket 12 of FIGS. 2A and 2B better illustrate how a plurality of teeth across the width of the sprocket 12 cooperates with drive surfaces on the conveyor belt. However, it should be appreciated that a belt could be substantially wider and require significantly more than four sprockets and each sprocket could have a significantly larger number of teeth across the full width of the sprocket such as for example on the order of 20 or more teeth. Thus, fabrication of a sprocket by using preformed lamina in this manner is substantially easier than making a sprocket having a similar increased amount of contact or surface area from a single piece of material. It should further be noted that in the embodiment of FIGS. 1, 2A and 2B, there is also included toothless lamina or spacers such as the disk shaped spacers 52 and 56 located between the tooth lamina 50, 54 and 58. In this embodiment, it is noted that the thickness of the spacer or toothless lamina is slightly greater than the thickness of the elongated links 30, and 32 such that as aligned teeth are received by the sprocket recesses the elongated links will be located between the tooth sprocket lamina. It will of course be appreciated rather than having toothless lamina or disks used as spacers, any type of means for suitably spacing the lamina may be used. For example, in the embodiment of FIGS. 1, 2A and 2B, four bolts 72, 74, 76 and 78 are shown as holding the stacked and aligned lamina together. Therefore, it would be possible to simply use four washers having the proper thickness located on the bolts in between each of the toothed lamina to provide the spacing. It will also be appreciated, of course that the stacked toothed and toothless lamina could be held together by spot welding or other means rather than bolts 72, 74, 76 and 78.

It will be understood by those skilled in the art that conveyor belts are often required to be in all sizes of width and length, to accomplish various types of conveying needs. Consequently, it is highly desirable that the belting system be made of modules or units which can be placed together in an end-to-end and side-by-side relationship so as to form a belt of any suitable width or length.

FIG. 3 illustrates how belts made of modules of the types discussed above may be made of identical modules having a single width along with a few partial or half modules so as to form a belt three modules wide but which also has substantially the strength of a single module across the belt. The strength of the belt is achieved as a result of the intermeshing and interlocking of the pivot ends. As shown, the full length modules 80, 82, and 84 are simply laid side-by-side across the width of the belt. Each row on both sides of the row comprised of modules 80, 82 and 84 include two full size modules such as modules 86 and 88 and two partial modules such as 90 and 92. When this brick-layed pattern is continued for the length of the belt, the belt has substantially more strength across it width than it would without the brick-laying. However, it should be understood that whether or not the belt is brick-layed, or simply one module wide, (no matter how wide the module) the sprocket of this invention can be used to provide increased contact area of the driving surfaces.

Figure 4A:
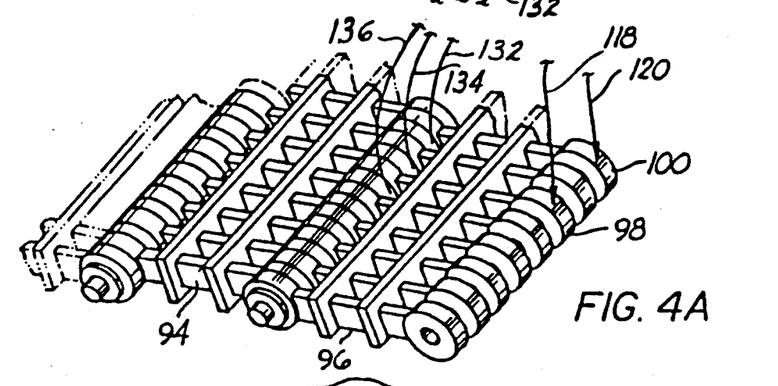
FIGS. 4A & 4B are perspective views of a different embodiment of a belt and sprocket respectively incorporating the features of this invention.
Figure 4B:
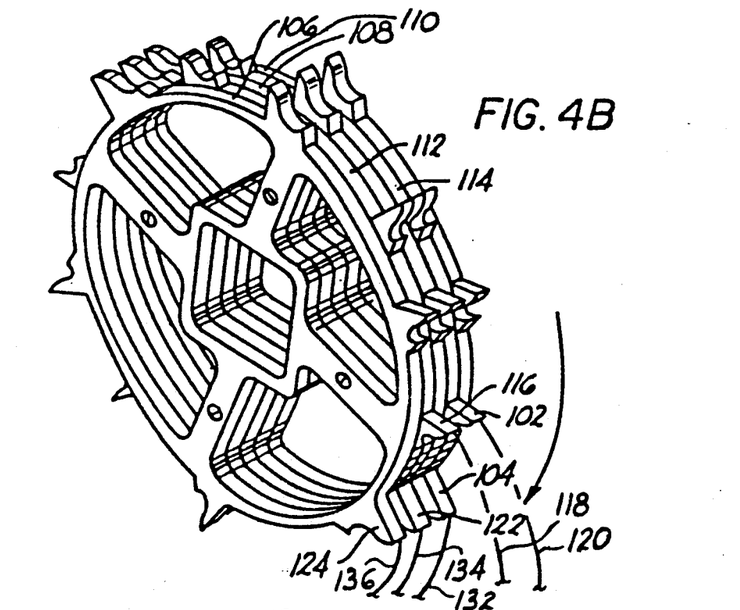
Figure 4C:
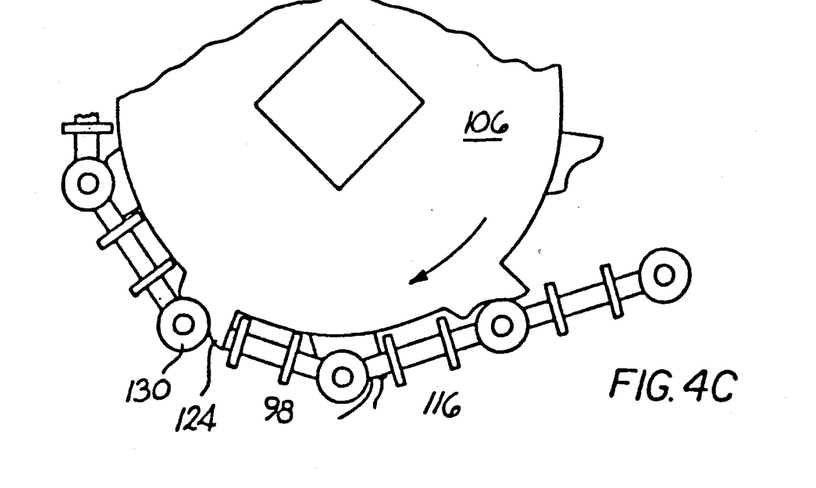
FIG. 4C is a side view of the belt and sprocket of FIGS. 4A and 4B in a drive relationship.

Referring now to FIGS. 4A, 4B and 4C there is shown another type of belt module and a sprocket for cooperating with such a modular belt which incorporates the features of this invention. As shown in FIG. 4A, every other row, such as rows 94 and 96, of the belt is offset with respect to the previous row, and the belt is driven by sprocket teeth which contact the link ends such as link ends 98 and 100 rather than the center portion of the belt. Thus, as shown in FIG. 4B it is necessary that every other sprocket tooth around the perimeter such as sprocket teeth 102 and 104 also be staggered such that each of the link ends may be in contact and driven by tooth. As can be seen therefore, there are two different types of lamina incorporated with each sprocket of this embodiment. The two types of laminas are substantially the same, except they are rotated with respect to their orientation to the drive or square aperture. Thus, laminas having reference numbers 106, 108 and 110 are of one type and laminas interspersed therebetween having referenced numbers 112, and 114 are of the second type. In a preferred embodiment, again the thickness of the lamina is slightly greater than the same thickness of the elongated members or links of the conveyor belt. On the example shown in FIGS. 4A and 4B, it can be seen that teeth 102 and 116 contact and drive link ends 100 and 98 respectively, as is indicated by arrow 118 and 120, and in a similar manner, teeth 104, 122 and 124 drive link ends 126, 128 and 130 as indicated by arrow 132, 134 and 136 respectively. FIG. 4C is a combination cross-sectional view showing the staggered teeth and how the belt is driven at its link ends rather than at the center of the module.

Figure 5A:
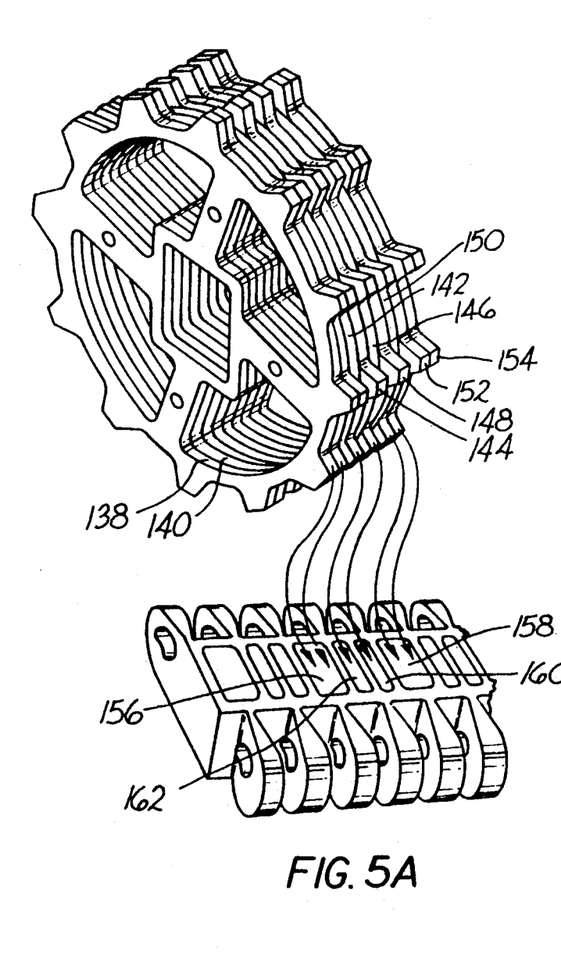
FIGS. 5A and 5B illustrate still another embodiment of a belt and two types of cooperating sprockets incorporating the features of this invention.
Figure 5B:
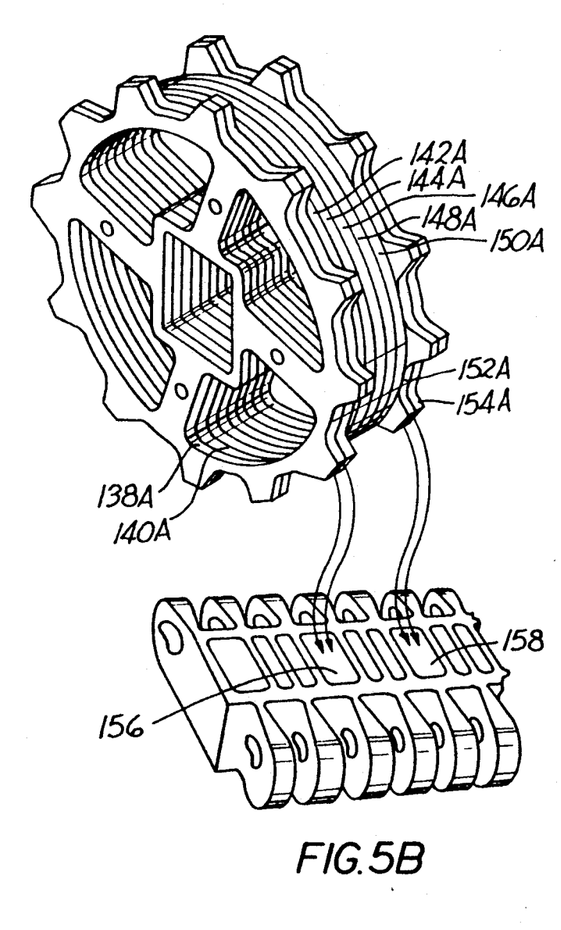
Figure 6:
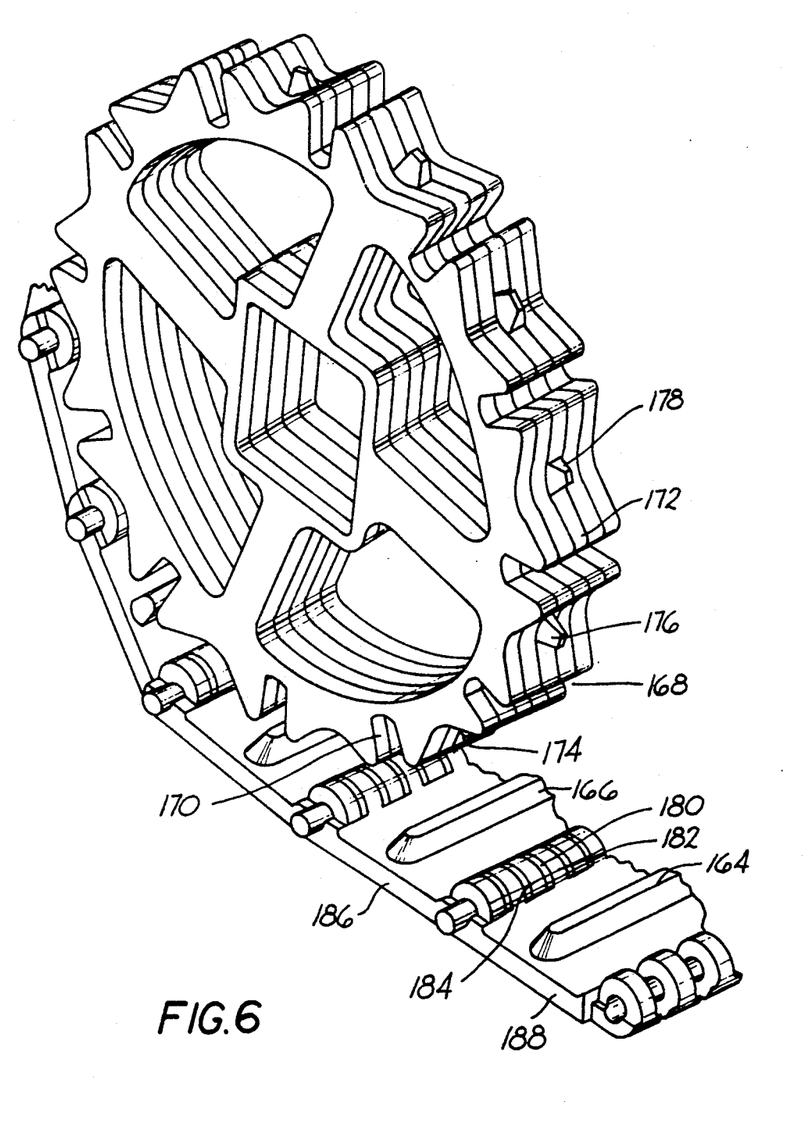
FIG. 6 shows still another embodiment of a conveyor belt and a cooperating sprocket incorporating the features of this invention.

FIGS. 5A and 5B show still another type of of belt and two types of cooperating sprockets which incorporate the teachings of this invention suitable for driving such a belt. According to FIG. 5A, it will be noted that there are two-toothed laminas 138 and 140, stacked next to each other followed by a toothless lamina or spacer 142, another toothed lamina 144, a spacer 146, another toothed lamina 148, a spacer 150, and then two more toothed lamina 152 and 154. Thus, there is one tooth that is two thicknesses wide and two teeth which are a single thickness wide followed by another tooth that is two thickness. This arrangement provides the maximum amount of driving surface that can be obtained with a belt of this type. FIG. 5B shows an alternate embodiment for driving the belt, but only uses two stacked lamina 138A and 140A followed by five spacers 142A, 144A, 146A, 148A and 150A and then two more stacked tooth lamina 152A and 154A. In this way, only the large driving recesses 156 and 158 will receive a driving tooth, whereas according to the embodiment of FIG. 5A the small recesses 160 and 162 also receive a single thickness driving tooth. Referring now to FIG. 6, there is shown still another type of belt suitable for being driven by a sprocket incorporating the features of this invention. As shown, the belt of this embodiment does not include driving recesses but instead include a single driving rib such as driving ribs 164 and 166 across the width of the belt and/or module. Consequently, to cooperate with the belt the sprocket includes recess driving surfaces such as recesses 168 and 170 which receive the driving cross-member of the belt. Further as shown in this example identical lamina are simply stacked together in as large a number as is desired to achieve the width of the sprocket desired. It should be noted however, that such a sprocket having only the driving recesses would not provide any tracking to the belt. Therefore, there is also provided on selected ones of the lamina, such as lamina 172, additional guide teeth such as guide teeth 174, 176 and 178 which are received by the spaces between the intermeshed link ends such for example space 180 between link ends 182 and 184 of modules 186 and 188.

Figure 7:
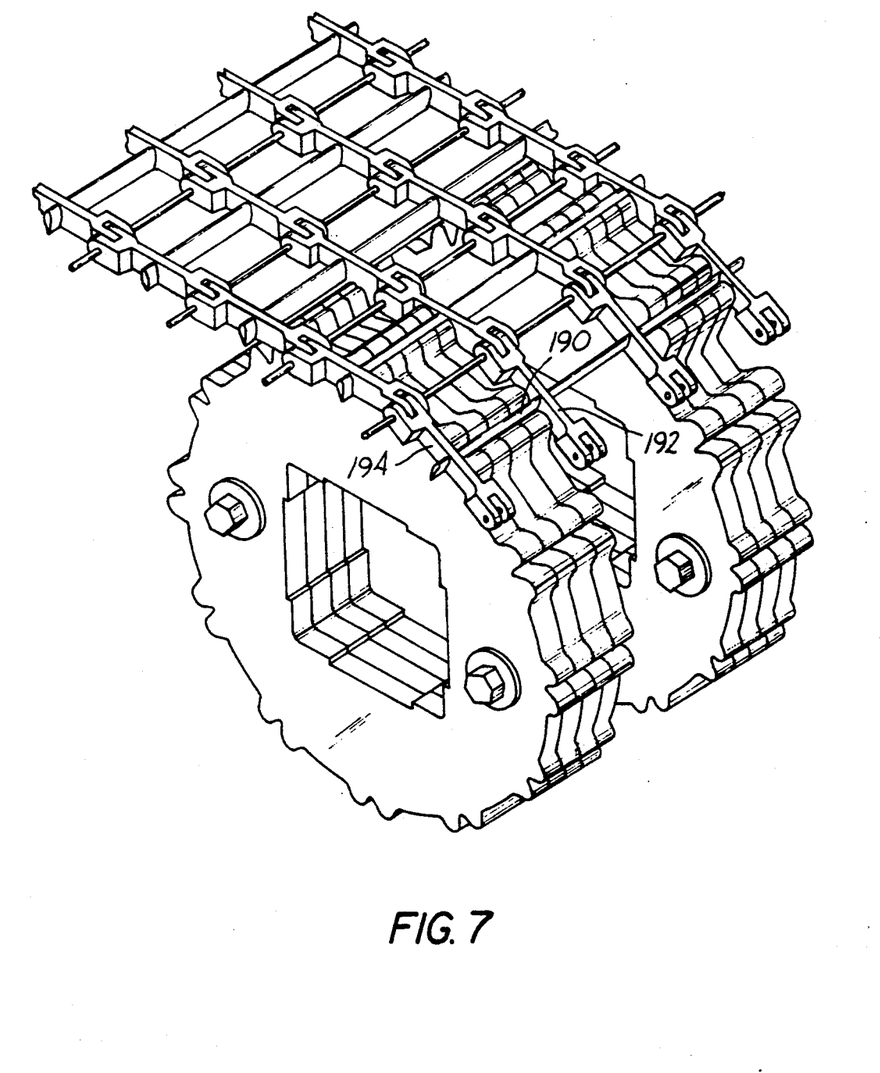
FIG. 7 is yet another embodiment of a conveyor belt and a cooperating sprocket incorporating the features of this invention.

Still another belt suitable for being driven by a laminated sprocket of this invention also includes a cross-member 190 (or group of cross-members) for receiving a driving force, but in this example, the cross-member 190 is located between the elongated support ribs 192 and 194 rather than a single cross-member across the bottom of the belt module. In this type of structure, it is again necessary to provide recesses in the lamina forming the sprocket.

Thus, although there has been described to this point particular embodiments of sprockets for use with different types of conveyor belts, each described sprocket incorporating stacked and aligned lamina securely joined together to form a rigid sprocket having at least two teeth of guiding areas across the width of the belt, it is not intended that such specific references be considered as limitations upon the scope of this invention except insofar as is set forth in the following claims.

We claim:

1. A drive sprocket of a selected diameter and width having at least two surfaces spaced across the width of said sprocket for engaging mating structure in modular conveyor belts comprising:

a plurality of sprocket lamina having substantially a constant thickness and a selected axis of rotation, each lamina defining a lamina drive aperture coaxially about said axis of rotation of a configuration for rotating the lamina with a mating non-circular drive shaft extending through the drive aperture, a multiplicity of driving surfaces disposed circumferentially on selected ones of said lamina radially from said axis of rotation and distributed at a plurality of selected angular positions around said axis of rotation, each said selected ones of said lamina thereby defining a circumferential set of similar driving surfaces;

at least one sprocket lamina of a different circumferential configuration from said selected ones of said lamina, said plurality of lamina being stacked and aligned such that said drive apertures of said plurality of lamina are in register for receiving said drive shaft;

said sprocket and aligned lamina being further aligned such that said circumferential set of driving surfaces of each of the selected ones of said lamina are in register with the driving surfaces of at least one other of the selected ones of said lamina at said selected angular positions around the axis of rotation; and means for joining said plurality of sprocket lamina to form a rigid structural unit having at least two of said driving surfaces of each said selected angular position around said drive axis.

2. Conveying apparatus comprising:
a conveyor belt fabricated at least in part from a multiplicity of similar modules, each module having a first and second group of link ends wherein first group of link ends of each module of said multiplicity is intermeshed and pivotally connected with said second group of link ends of another one of said multiplicity to form said conveyor belt and wherein said similar modules form a plurality of driving surfaces across the width of the conveyor belt; and at least one drive sprocket having a selected thickness disposed across said width of the conveyor and at least two circumferential sets of driving surfaces for mating with said driving surfaces on the belt, each one of said at least two sets of driving surfaces spaced along said selected thickness to mate with said plurality of driving surfaces of the belt, said sprocket further comprising:

a plurality of sprocket lamina having substantially a constant thickness and a selected axis of rotation each of said lamina defining a drive aperture coaxially about said axis of rotation and selected ones of said lamina defining a multiplicity of driving surfaces radially disposed from said axis of rotation and spaced at selected angular positions around said axis of rotation thereby defining said circumferential sets of driving surfaces;

said plurality of lamina being stacked and aligned with at least one intermediate lamina of a different configuration such that the drive apertures of all said stacked and aligned lamina are in register and such that said selected ones of said lamina are further aligned so that said circumferential sets of driving surfaces of said selected ones are in register, and means for joining said selected and aligned plurality of lamina to form a rigid sprocket structure having at least two driving surfaces at each selected angular position around said axis suitable for driving said conveyor belt.

3. The conveying apparatus of claim 2, further comprising a plurality of said sprockets spaced from each other at selected distances across the width of the conveyor belt.

4. Conveying apparatus comprising in combination, a conveyor belt having drive apertures therein for receiving sprocket teeth, and drive sprocket of predetermined width engaged to drive said belt from a rotating power source, said drive sprocket having at least two sets of circumferentially spaced driving teeth spaced across the width of said sprocket, said sprocket comprising a plurality of sprocket lamina of substantially constant thickness adapted to rotate about a common axis of rotation, wherein at least one lamina of a first configured is interspersed between drive lamina forming said two sets of driving teeth of a second configuration, said circumferentially spaced driving teeth being formed by said drive lamina to comprise teeth radially dispersed about said axis of rotation at selected angular positions about said axis, means stacking and aligning and joining together a plurality of said lamina as a rigid structure with said sets of circumferential driving teeth in registry, and means for engaging the circumferential driving teeth with the belt drive apertures to drive the conveyor belt wherein said lamina are stacked to register the driving teeth in rows parallel to the axis of rotation.

5. The conveying apparatus as defined in claim 4 wherein the teeth on adjacent ones of the stacked lamina are in registry in said rows.

6. The conveying apparatus as defined in claim 4 wherein said lamina of the first configuration are devoid of driving teeth and are interspersed as spacer lamina between lamina of the second configuration in said rigid structure to present circumferential structure not interfering with registration of said driving teeth with the belt drive apertures.

7. Conveying apparatus comprising in combination, a conveyor belt having periodically spaced drive surfaces therein adapted to receive mating drive surfaces from a driving sprocket, driving sprocket means comprising a plurality of stacked drive lamina for rotation about an axis and each defining an axially positioning mating drive surface, a subset of said drive lamina having an outer circumferential surface with said mating drive surfaces located in selected angular positions and registered to rotate about said axis with at least one lamina of a different configuration interspersed between the lamina in said subset of drive lamina, and means coupling the sprocket means with the mating drive surfaces engaged in said drive surface apertures of the belt to drive the belt therefrom.

8. A drive sprocket for rotation about an axis to present driving surfaces for engaging mating driving structure in a conveyor belt constructed of modular belt units linked together, comprising in combination,
a plurality of sprocket lamina of substantially constant thickness adapted for rotation about said axis,
a multiplicity of driving surfaces on selected ones of said lamina positioned at selected radial positions from said axis and spaced at a set of angular positions around said axis to define a circumferential group of driving surfaces,
at least one further said lamina of different configuration from said selected ones of said lamina interspersed between two of said selected ones of said lamina,
said selected ones of said lamina being positioned in and aligned in a stack of said lamina with said at least one further said lamina with said driving surfaces of one of said selected ones of said lamina in register at a plurality of angular positions about the drive axis with at least one other one of the selected ones of said lamina, and
means for joining said plurality of sprocket lamina to form a rigid structure rotatable about said axis and presenting said driving surfaces in a pattern for engaging the driving structure of said conveyor belt in a driving relationship.

9. A drive sprocket as defined in claim 8 wherein said at least one further said lamina of different configuration further comprises,
a spacer set of said sprocket lamina without driving surfaces interspersed in said stack of lamina between at least some of said selected ones of the lamina having driving surfaces.

10. The sprocket as defined in claim 9, wherein said lamina without driving surfaces and said lamina with driving surfaces are alternately interspersed in said rigid structure.

11. The sprocket as defined in claim 9 having at least one set of two adjacent registered lamina having driving surfaces.

12. The sprocket as defined in claim 11 wherein said at least one lamina of different configuration comprise single lamina without a driving surface positioned between at least said two adjacent lamina with driving surfaces and said lamina with driving surfaces distributed in sets of fewer and more adjacent lamina thereby to provide driving means for engaging said driven body at both narrower and broader mating driving structure apertures in said belt.

13. The sprocket as defined in claim 8, further comprising on said at least one lamina of different configuration two different driving surfaces at different radial positions from said axis.

14. The sprocket as defined in claim 8, wherein said selected ones of said lamina with driving surfaces are positioned in a set of lamina next to each other in said rigid structure and wherein said lamina of different configuration comprise spacer lamina without driving surfaces positioned adjacent said set of lamina disposed next to each other.

15. The sprocket as defined in claim 14 wherein said set of lamina disposed next to each other has driving surfaces comprising a notch for engaging a driving member on the driven body that spans a plurality of the lamina in the set disposed next to each other.

16. The sprocket as defined in claim 14 wherein said selected ones of said lamina are in a set of adjacent lamina with driving surfaces disposed next to each other to define a driving surface comprising a notch for engaging a mating driving member on the belt that spans the lamina in said set disposed next to each other.

17. The sprocket as defined in claim 8 wherein each lamina has a driving aperture therein surrounding said axis of substantially square shape for engaging a drive shaft for rotating the rigid structure, with the driving apertures in register in said rigid structure.

18. A conveyor belt driving system, comprising in combination, a drive sprocket having driving surfaces thereon adapted to rotate about a sprocket axis, a conveyor belt engaged by said drive sprocket driving surfaces in mating contact with driven surfaces on said belt, said drive sprocket formed of a plurality of sprocket lamina of substantially constant thickness for rotation about said axis, at least two of said lamina presenting at angular positions about said axis at a selected radial distance from the axis at a set of driving surfaces, further of said lamina comprising spacer lamina without driving surfaces and means for joining the lamina into a rigid structure rotatable about said axis to present the driving surfaces in a pattern with said spacer lamina having no driving surfaces therebetween for engaging spaced apart driven surfaces in driving relationship.

19. The system of claim 18 wherein the set of driving surfaces comprises at least one set of side by side lamina with registered driving surfaces.

* * * * *